United States Patent [19]

Messina

[11] Patent Number: 5,791,056
[45] Date of Patent: Aug. 11, 1998

[54] EMERGENCY GLASS BREAKING TOOL

[76] Inventor: Gary D. Messina, 476 Cedar Ave., West Long Branch, N.J. 07764

[21] Appl. No.: 755,163

[22] Filed: Nov. 22, 1996

[51] Int. Cl.⁶ .................................................... B26F 1/32
[52] U.S. Cl. .................................................. 30/361; 30/367
[58] Field of Search .......................... 30/361, 366–368, 30/296.1, 296.4; 234/131; 223/93

[56] References Cited

U.S. PATENT DOCUMENTS 3,349,821 10/1967 Moeller ................................ 30/366 X

*Primary Examiner*—Douglas D. Watts
*Attorney, Agent, or Firm*—Robert M. Skolnik

[57] ABSTRACT

A glass breaking tool includes an elongate plunger which has a pointed head (i.e. ram member) at one end. The plunger, including the pointed head, is normally arranged within a housing. A contact block may be secured to the plunger at the second end thereof A coil spring may surround the plunger and may extend between the contact block at the second end of the plunger and a portion of the housing which may be substantially adjacent the first end of the plunger near the pointed head portion. The plunger is adapted for movement from its rest position where the pointed head is arranged within the housing to an extended position where the pointed head extends outside of the housing. Suction cups or adhesive is used to attach the tool to the portion of glass to be broken.

2 Claims, 1 Drawing Sheet

EMERGENCY GLASS BREAKING TOOL

FIELD OF THE INVENTION

This invention relates to an emergency glass breaking tool to allow people trapped inside of vehicles or other enclosed spaces to escape by breaking glass windows or partitions.

DESCRIPTION OF THE PRIOR ART

Brown, U.S. Pat. No. 101,424 shows an ice pick having an elongate plunger with a pointed head normally arranged in a substantially retracted position. The head is extendible on overcoming the internal force of a coil spring.

Stacy, U.S. Pat. No. 1,110,969 slides a member on the exterior of a shaft to impart forces to a portion of the tool.

Trumpeter, U.S. Pat. No. 1,424,221 discloses an impact tool similar to that shown in Brown.

Lofstrand, U.S. Pat. No. 2,135,404 teaches a tool for breaking bottles which uses release of a spring loaded piercing element to break the bottle.

Rappaport, U.S. Pat. No. 3,407,499 shows a metal punch which uses the force generated by a compression spring to force the punch into the metal.

Roxton, U.S. Pat. No. 4,268,926 relies on the reciprocal motion of a hammer to generate forces in an emergency tool.

Sprouse, U.S. Pat. No. 4,693,403 discloses a glass breaking tool which is designed to break glass along a pre-formed score line.

Alderete, U.S. Pat. No. 4,848,309 teaches a masonry punch for cinder block where a housing having a central shaft is positioned against the block and a piercing tool centrally mounted in the housing is struck by a hammer to form a rectangular opening in the block.

Hasegawa, U.S. Pat. No. 5,097,599 relates to an emergency escape tool for breaking window glass. As described, compression of a spike causes a weight to release against the spike generating an impact force on the glass.

Clark, et al., U.S. Pat. No. 5,433,007 teaches a hand operated impact tool where the user withdraws a plunger to compress a spring to cause impact at the work site.

Other patents generally teaching spring release of a punch head include Porter. U.S. Pat. No. 1,134,082; Pierce, U.S. Pat. No. 3,169,683; Yoho, et al, U.S. Pat. No. 3,494,431; Carver, U.S. Pat. No. 3,791,034; Abos, U.S. Pat. No. 3,883,055; and Viscio, et al., U.S. Pat. No. 5,172,842.

SUMMARY OF THE INVENTION

Design trends in automobiles have provided them with additional glass windows and other glass areas. Buildings have also been constructed with large glass windows and partitions. With so many power accessories and safety, comfort and security subsystems in a vehicle or in a building, the ability of occupants to escape in the event they are trapped. In a vehicle, for example, with the air conditioning running, the windows are closed. Many vehicles have power lock doors, windows, self-locking doors, and childproof door latches. These security/safety subsystems are controlled at the drivers seat by the driver. There is no electrical override. In an emergency, the driver must release these subsystems to allow passengers to exit the vehicle.

In an accident, including one in which the vehicle remains upright, an electrical failure, fore or electrical short in a subsystem precludes the ability to rapidly exit the vehicle. If the vehicle is flipped over or is submerged in water, exit is prevented unless the windows are broken. Safety glass in vehicles is difficult to break by kicking or punching. The ability to exit rapidly is essentially of smoke, fire, water or fumes are entering the passenger compartment. If doors are locked, jammed or inoperable, the only means of escape is through a window.

Attempts to successfully break a window manually as by a kick, elbow, punch, or slam is difficult because the window glass has flexibility and absorbs some of the energy of the blows. Repeated unsuccessful attempts to break out increase fear and anxiety from the inability to escape.

In buildings, large, thick, plate glass windows are more difficult to break than is vehicle glass. It is known that attempts to escape from a building involve smashing a chair against a window pane only to have the pane crack but not break open.

The present invention is a hand held tool which can break the window glass in an emergency. The tool can be kept inside a vehicle by hanging it from a knob on the dash so that it is easily accessible. The tool may have a visible light to identify its location in darkness. By rapping a plunger with the heel of the hand, the knee, or the foot, the plunger is pushed into the glass to shatter and scatter the window. The present invention provides for rapid removal of the window as a barrier to ingress or egress.

The present invention provides an emergency glass breaking tool for use by individuals who may be trapped in an automobile after an accident, in a building during a fire, or other emergency situations. More particularly, the glass breaking tool of my invention includes an elongate plunger which has a pointed head (i.e. ram member) at one end. The plunger, including the pointed head, is normally arranged within a housing. A contact block may be secured to the plunger at the second end thereof A coil spring may surround the plunger and may extend between the contact block at the second end of the plunger and a portion of the housing which may be substantially adjacent the first end of the plunger near the pointed head portion. The plunger is adapted for movement from its rest position where the pointed head is arranged within the housing to an extended position where the pointed head extends outside of the housing.

In operation, the pointed head of the plunger may be quickly moved from its next position to its extended position where it may be rammed into a window with sufficient force to break the glass. In the preferred embodiment, a plurality of suction cups or an adhesive is arranged about the periphery of the housing at the end of the housing where the pointed head of the plunger exits the housing. The suction cups or adhesive facilitates attachments of the glass breaking tool to a window so that it can be operated if only one arm is free. Once the glass breaking tool is secured to a window by the suction cups or the adhesive, a user simply hits the contact block at the second end of the plunger with sufficient force to cause the pointed head of the plunger to extend out of the housing so that a glass window is broken on impact by the pointed head.

The suction or adhesive may be of sufficient strength to self-support the glass breaking tool on the window despite the relative position of the window and the tool, so that in a vehicle roll-over accident the tool will "stick" to the window by itself without the need for a person to provide any support for the tool.

A principal object of the invention is the provision of an emergency glass breaking tool. Another object of the invention is the provision of a glass breaking tool which can be affixed to a glass window. A still further object and advantage of the present invention is the provision of an emergency glass breaking tool which is affixed to a window with sufficient force to hold the tool against the window without the need for further support. A still further object and advantage of the present invention is the provision of a glass breaking tool which is affixed to the window by suction or by adhesive. Another object and advantage of the present invention is the provision of an emergency tool which breaks glass by striking a relatively large spring loaded plunger. Another object and advantage of the present invention is the provision of an emergency tool which can be easily and inexpensively fabricated.

A still further object and advantage of this invention is the provision of an emergency tool which incorporates a visible light to indicate the location of the tool in darkness.

BRIEF DESCRIPTION OF THE DRAWINGS

These as well as further objects and advantages of the invention will become apparent to those skilled in the art from a review of the following detailed specification of my invention reference being made to the accompanying drawings in which.

DETAILED DESCRIPTION OF THE INVENTION

Figure 1:
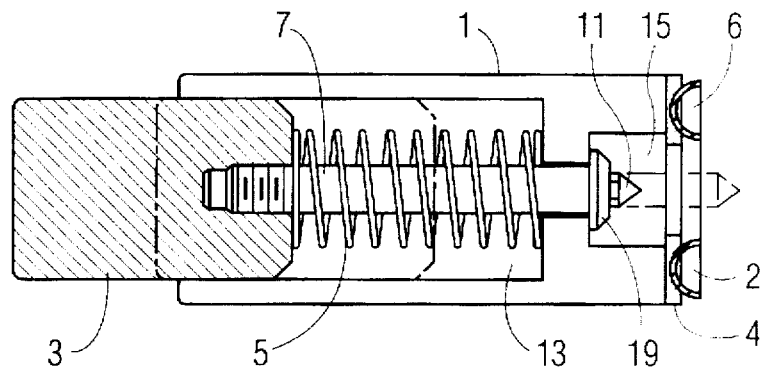
FIG. 1 is a sectional view of my invention.

FIG. 1 is a side sectional view of the invention. A cylindrical body 1 has two bores 13 and 15 formed at the ends thereof. Bore 13 receives and supports a spring loaded striking knob 3. The knob 3 is attached to the plunger shaft 7 of a glass piercing tool 11. Spring 5 surrounds the plunger shaft 7 in the bore 13 and serves to maintain the knob 3 in the position shown in FIG. 1. A portion of the plunger shaft 7 extends into bore 15. The plunger shaft 7 is held against the force exerted by spring 5 by a collar 19 formed on the plunger shaft 7 adjacent the piercing tool 11. Collar 19 also serves to enlarge the area of a pane of glass to be broken after the pane is initially hit by piercing point 11.

Figure 2:
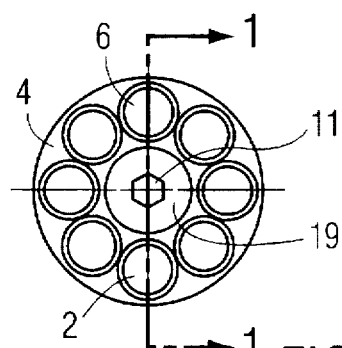
FIG. 2 is an end view of the apparatus of FIG. 1.

As shown in FIG. 2, a plurality of suction cups such as 2 and 6 are arranged about the peripheral edge of the body 1 at the mouth of the aperture 15. These suction cups are formed as a unitary structure on base 4. The base 4 is attached to the peripheral edge of the body 1. The suction cups permit passage of the piercing point 11 and enlarged collar 19 through a central aperture in the base 4. The suction cups provide sufficient force to enable the tool to adhere to the surface of a pane of glass.

Figure 3:
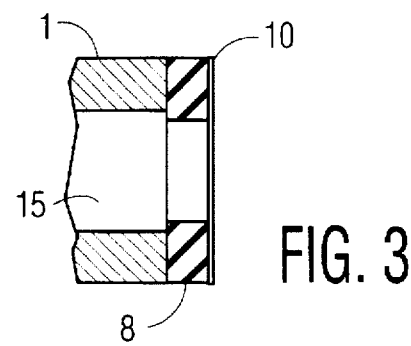
FIG. 3 is a sectional view of a portion of an alternate embodiment of the invention shown in FIG. 1.
Figure 4:
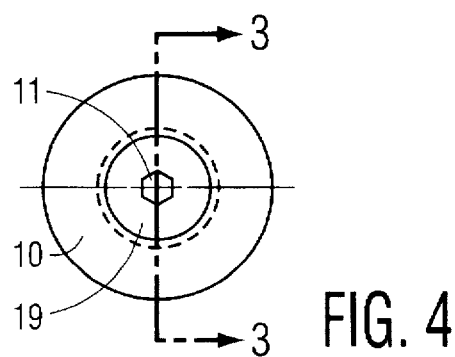
FIG. 4 is an end view of the apparatus of FIG. 3.

As shown in FIGS. 3 and 4, an alternative to the suction cups of FIGS. 1-2 is provided. A rubber ring 8 is connected to the peripheral edge of the body 1 about the mouth of bore 15. This ring carries a peel-off adhesive surface 10. The peel may have an open central aperture as shown in FIG. 4. Alternatively, the peel may cover the mouth of bore 15. The peelable adhesive provides sufficient adhesion force to hold the tool on a pane of glass.

The tool of FIGS. 1-2 or FIGS. 3-4 is intended to be located in plain sight to be easily accessible in an emergency. When needed, the tool grasped and attached to a glass window. The knob 3 is struck with a hand, foot, fist, elbow, etc. causing it to move against the force exerted by spring 5 to the position shown in dotted lines in FIG. 1. This motion forces the piercing tool 11 and collar 19 into the glass causing it to break As will be apparent to those skilled in the art, further modifications to the methods and apparatus of the invention may be made without departing from the spirit and scope of the invention; accordingly, what is sought to be protected is set forth in the appended claims.

I claim:

1. A glass breaking tool comprising, a housing, an elongated plunger mounted in said housing said elongated plunger having a pointed head at one end and a contact block at the other end; spring means surrounding said elongated plunger, said spring means extending between said contact block and a portion of said housing substantially adjacent said elongated plunger in proximity to said pointed head for maintaining said elongated plunger in a rest position; and attaching means, said attaching means including peelable adhesive connected to said housing for attaching said housing to a portion of glass to be broken.

2. A glass breaking tool comprising; a cylindrical body having first and second bores formed at the ends thereof, said bores being separated by a wall; a striking knob mounted in said first bore; a pointed tool formed in said second bore; a shaft connecting said striking knob and said pointed tool, compression spring means surrounding said shaft connected to said striking knob and one side of said wall for maintaining said knob, said shaft and said pointed tool in a first position; collar means surrounding said shaft adjacent said pointed tool for contacting the other side of said wall when said knob, said shaft and said pointed tool are in said first position to assist in maintaining said first position and means including peelable adhesive for attaching said glass breaking tool to a portion of glass to be broken.

\* \* \* \* \*